United States Patent
Stoddard et al.

(10) Patent No.: US 10,872,367 B1
(45) Date of Patent: Dec. 22, 2020

(54) SYSTEMS AND METHODS FOR CONTROLLING PERMISSIONS PERTAINING TO SALES ACTIVITIES BY USERS OF AN ONLINE GAME

(71) Applicant: Mythical, Inc., Sherman Oaks, CA (US)

(72) Inventors: Samuel Stoddard, Seattle, WA (US); Jamie Jackson, Seattle, WA (US); Stephan Cunningham, Pasadena, CA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

(21) Appl. No.: 16/460,757

(22) Filed: Jul. 2, 2019

(51) Int. Cl.
  *G06Q 30/00* (2012.01)
  *G06Q 30/06* (2012.01)

(52) U.S. Cl.
  CPC ..... *G06Q 30/0609* (2013.01); *G06Q 30/0641* (2013.01)

(58) Field of Classification Search
  None
  See application file for complete search history.

(56) References Cited

U.S. PATENT DOCUMENTS

| | | | | |
|---|---|---|---|---|
| 6,085,169 A * | 7/2000 | Walker | ............ | G06Q 10/02 705/4 |
| 2002/0123938 A1* | 9/2002 | Yu | ............ | G06Q 30/06 705/26.43 |
| 2011/0302037 A1* | 12/2011 | Sutton-Shearer | ...... | G06Q 30/02 705/14.66 |
| 2012/0015699 A1* | 1/2012 | Kalvachev | ............ | A63F 13/00 463/1 |
| 2012/0030069 A1* | 2/2012 | Garg | ............ | G06Q 30/02 705/27.1 |
| 2013/0110720 A1* | 5/2013 | Rekhi | ............ | G06Q 20/35785 705/44 |
| 2014/0335948 A1* | 11/2014 | Jung | ............ | A63F 13/00 463/31 |
| 2016/0292680 A1 | 10/2016 | Wilson, Jr. | | |

(Continued)

OTHER PUBLICATIONS

Zheng Qin, "Introduction to E-commerce", 2009, Springer, springer.com (Year: 2009).*

(Continued)

*Primary Examiner* — Naeem U Haq
*Assistant Examiner* — Norman Donald Sutch, Jr.
(74) *Attorney, Agent, or Firm* — Esplin & Associates, PC (57) ABSTRACT

Systems and methods for controlling sales permissions pertaining to sales activities by users of an online game are disclosed. Exemplary implementations may: store information on electronic storage related to the users of the online game; execute an instance of the online game and implement the instance of the online game; receive supervisory input from a supervisory user; receive user input to request or initiate a sale; determine whether the request is in accordance with the one or more sales permissions; effectuate a performance of the sale of one or more particular virtual items, responsive to a determination that the request is permitted; and effectuate presentation of a notification to the user that conveys the user lacks permission, responsive to a determination that the request is not permitted under the one or more sales permissions.

18 Claims, 3 Drawing Sheets

(56) References Cited

U.S. PATENT DOCUMENTS

| | | | |
|---|---|---|---|
| 2017/0083959 A1* | 3/2017 | Bousis | G06Q 30/0609 |
| 2017/0148264 A1* | 5/2017 | Pichette | G06Q 30/06 |
| 2018/0078843 A1 | 3/2018 | Tran | |
| 2018/0114403 A1 | 4/2018 | Jayachandran | |
| 2018/0117447 A1 | 5/2018 | Tran | |
| 2018/0204260 A1 | 7/2018 | McGregor | |
| 2018/0205740 A1* | 7/2018 | Clark | G06Q 10/107 |
| 2018/0247191 A1 | 8/2018 | Katz | |
| 2018/0276630 A1 | 9/2018 | Kim | |
| 2019/0005595 A1 | 1/2019 | Tautenhan | |
| 2019/0205873 A1 | 7/2019 | Kamalsky | |
| 2019/0220836 A1 | 7/2019 | Caldwell | |
| 2019/0236605 A1 | 8/2019 | McHale | |
| 2019/0282906 A1 | 9/2019 | Yong | |
| 2019/0295371 A1 | 9/2019 | Simons | |
| 2019/0303892 A1 | 10/2019 | Yantis | |
| 2019/0311341 A1 | 10/2019 | Rice | |
| 2019/0361917 A1 | 11/2019 | Tran | |
| 2019/0386969 A1 | 12/2019 | Verzun | |
| 2020/0005284 A1 | 1/2020 | Vijayan | |
| 2020/0184041 A1 | 6/2020 | Andon | |
| 2020/0202668 A1 | 6/2020 | Cotta | |
| 2020/0273048 A1 | 8/2020 | Andon | |

OTHER PUBLICATIONS

Janice Podsada; "With Sales of Virtual Goods, The Reality is Serious Revenue"; Jan. 7, 2009; Tribune Content Agency LLC (Year: 2009).*

* cited by examiner

Fig. 1

Fig. 2 supervisory user interface 30

Permission control 31

| Sales permissions: | Detailed information | Active |
|---|---|---|
| Sell items | item information 1 | ☐ |
| Protection | item information 2 | ■ |
| Select items/types | item information 3 | ☐ |
| Price threshold | item information 4 | ☐ |
| Confirm sale | item information 5 | ☐ | action button 32

*Fig. 3A* user interface 35 inventory 36

| Items: | Price information: | Sell? |
|---|---|---|
| virtual item 1 | item information 1 | ☐ |
| virtual item 2 | item information 2 | ☐ |
| virtual item 3 | item information 3 | ☐ |
| virtual item 4 | item information 4 | ☐ |
| virtual item 5 | item information 5 | ☐ | action button 37

*Fig. 3B*

SYSTEMS AND METHODS FOR CONTROLLING PERMISSIONS PERTAINING TO SALES ACTIVITIES BY USERS OF AN ONLINE GAME

FIELD OF THE DISCLOSURE

The present disclosure relates to systems and methods for controlling sales permissions pertaining to sales activities by users of an online game that are related to virtual items within the online game.

BACKGROUND

Certain types of parental controls on certain types of online and/or electronic entertainment are known. Age restrictions on certain types of online and/or electronic entertainment are known, in particular with regard to purchasing activities that use banking information, e.g., through credit cards.

SUMMARY

One aspect of the present disclosure relates to a system configured for controlling permissions pertaining to activities by users of an online game that are related to virtual items within the online game. The system may include one or more hardware processors configured by machine-readable instructions. The processor(s) may be configured to store information on electronic storage related to the users of the online game. The users may include a supervisory user and a first user. The information may establish a connection between the supervisory user and a first user account. The first user account may be associated with the first user. The first user account may include a first user inventory of a first set of virtual items. Usage of individual ones of the first set of virtual items may be under control of the first user. The processor(s) may be configured to execute an instance of the online game and implement the instance of the online game by receiving and executing commands. The commands may be received from users through client computing platforms associated with the users. Execution of the commands may facilitate interactions between the users, and to determine view information for presentation of the online game to the users on the client computing platforms. The processor(s) may be configured to receive supervisory input, from a supervisory client computing platform associated with the supervisory user. The supervisory input may reflect entry and/or selection by the supervisory user of one or more permissions pertaining to one or more activities. The one or more activities may be related to sales and/or offers for sale of one or more virtual items from the first set of virtual items. The processor(s) may be configured to receive first user input, from a first client computing platform associated with the first user. The first user input may reflect entry and/or selection by the first user of one or more particular virtual items from the first set of virtual items. The first user input further corresponds to a request by the first user to perform a sale and/or an offer for sale of the one or more particular virtual items. The processor(s) may be configured to determine whether the request is in accordance with the one or more permissions. The processor(s) may be configured to effectuate a performance of the sale and/or the offer for sale of the one or more particular virtual items, responsive to a determination that the request is permitted under the one or more permissions. The processor(s) may be configured to effectuate presentation of a notification to the first user that conveys the first user lacks permission to effectuate the request, responsive to a determination that the request is not permitted under the one or more permissions.

Another aspect of the present disclosure relates to a method for controlling permissions pertaining to activities by users of an online game that are related to virtual items within the online game. The method may include storing information on electronic storage related to the users of the online game. The users may include a supervisory user and a first user. The information may establish a connection between the supervisory user and a first user account. The first user account may be associated with the first user. The first user account may include a first user inventory of a first set of virtual items. Usage of individual ones of the first set of virtual items may be under control of the first user. The method may include executing an instance of the online game and implementing the instance of the online game by receiving and executing commands. The commands may be received from users through client computing platforms associated with the users. Execution of the commands may facilitate interactions between the users, and to determine view information for presentation of the online game to the users on the client computing platforms. The method may include receiving supervisory input, from a supervisory client computing platform associated with the supervisory user. The supervisory input may reflect entry and/or selection by the supervisory user of one or more permissions pertaining to one or more activities. The one or more activities may be related to sales and/or offers for sale of one or more virtual items from the first set of virtual items. The method may include receiving first user input, from a first client computing platform associated with the first user. The first user input may reflect entry and/or selection by the first user of one or more particular virtual items from the first set of virtual items. The first user input further corresponds to a request by the first user to perform a sale and/or an offer for sale of the one or more particular virtual items. The method may include determining whether the request is in accordance with the one or more permissions. The method may include effectuating a performance of the sale and/or the offer for sale of the one or more particular virtual items, responsive to a determination that the request is permitted under the one or more permissions. The method may include effectuating presentation of a notification to the first user that conveys the first user lacks permission to effectuate the request, responsive to a determination that the request is not permitted under the one or more permissions.

As used herein, any association (or relation, or reflection, or indication, or correspondency) involving servers, processors, client computing platforms, users, user accounts, inventories, virtual items, types of virtual items, user inputs, requests, activities, sales, offers, permissions, notifications, determinations, threshold levels, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
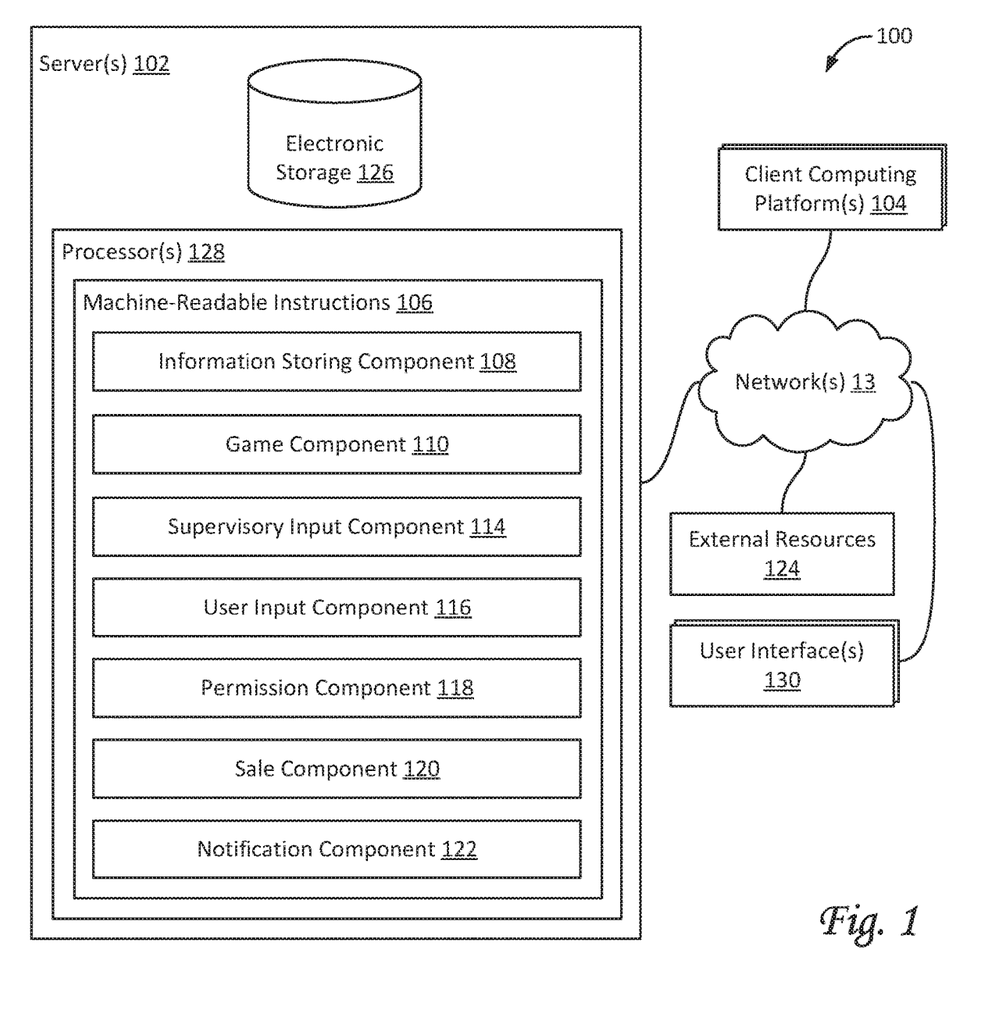
FIG. 1 illustrates a system configured for controlling sales permissions pertaining to (sales) activities by users of an online game that are related to virtual items within the online game, in accordance with one or more implementations.

FIG. 1 illustrates a system 100 configured for controlling permissions pertaining to certain types of activities by users of an online game that are related to virtual items within the online game, in accordance with one or more implementations. The users may include different types of users, including but not limited to supervisory users, users that may own and/or control virtual items within the online game, and/or other types of users. For example, the users may include a first user, a supervisory user, a third user, and so forth. Alternatively, and/or simultaneously, the users may include a first supervisory user, a second supervisory user, a third supervisory user, and so forth. The first user may have and/or be associated with a first user account. The second user may have and/or be associated with a second user account, and so forth. The first user account may have and/or include a first user inventory of virtual items. The second user account may have and/or include a second user inventory of virtual items, and so forth. At least certain types of usage of the virtual items in the first user inventory may be under control of the first user. Other types of usage and/or activities may not be under control of the first user. At least certain types of usage of the virtual items in the second user inventory may be under control of the second user, and so forth. Other types of usage and/or activities may not be under control of the second user, but may instead require permission from a particular supervisory user. For example, a type of usage controlled by a particular user may include performance of actions within the online game that use and/or require (ownership of) one or more particular virtual items. In some implementations, one or more types of usage that change ownership of particular virtual items may be outside the control (or not fully/solely under control) of the particular user who owns the particular virtual items. For example, in some implementations, the particular user may use a particular virtual item within the online game, but may not sell the particular item (e.g., to another user) unless a particular supervisory user has given permission for that sale or for such a sale. By virtue of the features described in this disclosure for system 100, a supervisory user may prevent that a user (who is associated with the supervisory user or has otherwise established a relation or connection with the supervisory user) is taken advantage of through the sale of virtual items (e.g., to different users within the online game). In other words, the supervisory user may protect the user through granting and/or denying permission for certain types of activities within the online game, including but not limited to selling virtual items, offering virtual items for sale or trade, auctioning virtual items, gambling with virtual items, and/or other activities that change ownership rights of virtual items. The particular one or more supervisory users who have the ability to grant and/or deny permissions for an individual user may be referred to as the pertinent one or more supervisory users.

As used herein, the phrase "virtual item" may refer to any item or object within the online game that a user may use, own, sell, trade, and/or otherwise effectuate a change of ownership of. As such, virtual items are not limited to objects, but may include characters, skills, abilities, virtual content within the online game, access rights within the online game, rights to (future) benefits within the online game, and/or other valuables within the online game.

In some implementations, system 100 may include one or more servers 102, one or more processors 128, electronic storage 126, user interfaces 130, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of information storing component 108, game component 110, supervisory input component 114, user input component 116, permission component 118, sale component 120, notification component 122, and/or other instruction components.

Information storing component 108 may be configured to store information on electronic storage 126 related to the users of the online game. The users may include a supervisory user, a first user, a second user, and/or other users. The stored information may include user accounts associated with the users. In some implementations, the supervisory user may be associated with a supervisory user account. The first user may be associated with a first user account. The second user may be associated with a second user account. The first user account may include a first user inventory of virtual items that may be used by the first user within the online game. The second user account may include a second user inventory of virtual items that may be used by the second user within the online game. In some implementations, the stored information may establish a relation and/or connection between the supervisory user and the first user account. For example, the first user may be an active player of the online game, and the supervisory user may, in some ways, act as a responsible party with regard to the first user. By way of non-limiting example, a parent may be a supervisory user and the parent's child may be the first user. In some implementations, the supervisory user may be associated with the first user account. In some implementations, a supervisory user may be associated in a manner that establishes a connection with multiple (other) user accounts, for one or more online games or gaming platforms. For example, a parent may control permissions pertaining to activities within one or more online games that modify or eliminate ownership rights of virtual items in one or more inventories that are included in the user accounts of one or more children/users. This particular supervisory user may be referred to as the pertinent supervisory user. This particular supervisory user account may be referred to as the pertinent supervisory user account.

For example, a first user may control usage of individual ones of a first set of virtual items that are included in a first user inventory of the first user. The usage of the individual ones of the first set of virtual items may include performance of actions within the online game that use and/or require (ownership of) the individual ones of the first set of virtual items. In some implementations, the actions under control of the first user may exclude selling and/or offering for sale the individual ones of the first set of virtual items. In some implementations, actions such as selling may require (express) permission of the pertinent supervisory user. In some implementations, permission to perform activities such as selling may granted or denied based on comparing a proposed sales activity with a set of permissions that are controlled by the pertinent supervisory user.

For example, a second user may control usage of individual ones of a second set of virtual items that are included in a second user inventory of the second user. The usage of the individual ones of the second set of virtual items may include performance of actions within the online game that use and/or require (ownership of) the individual ones of the second set of virtual items. In some implementations, the actions under control of the second user may exclude selling and/or offering for sale the individual ones of the second set of virtual items. In some implementations, actions such as selling may require (express) permission of the pertinent supervisory user. In some implementations, permission to perform activities such as selling may granted or denied based on comparing a proposed sales activity with a set of permissions that are controlled by the pertinent supervisory user.

In some implementations, access to a user account by the supervisory user may require a different authentication than access to the user account by the user itself. For example, in some implementations, a first user may access the first user account through a first password, and the pertinent supervisory user may access the first user account through a different password (or at least access to the part of the first user account that is related to granting, denying, and/or otherwise controlling permissions pertaining to certain types of activities that modify or eliminate ownership rights of virtual items in the inventory of the first user).

Game component 110 may be configured to execute an instance of the online game and implement the instance of the online game by receiving and executing commands (or requests). The commands may be received from users through client computing platforms associated with the users. By way of non-limiting example, execution of the commands may facilitate interactions between the users, and to determine view information for presentation of the online game to the users on the client computing platforms.

In some implementations, game component 110 may be configured to execute and implement an instance of the online game in a virtual space. The virtual space may include one or more of a multi-dimensional space, a two-dimensional space, a three-dimensional space, and/or another virtual space. An instance of the virtual space may include virtual space content determined based on individual virtual space content associated with individual objects and the arrangement(s) of the objects, and/or other information. In some implementations, the instance of the virtual space may include a simulated space that is accessible by the users. The simulated space may have a topography, express ongoing real-time interaction by one or more users, and/or include one or more objects positioned within the simulated topography that are capable of locomotion within the simulated topography. The simulated topography may include surface features of a surface or objects that are "native" to the space. In some instances, the simulated topography may describe a surface (e.g., a ground surface) that runs through at least a substantial portion of the space. In some instances, the simulated topography may describe a volume with one or more bodies and/or objects presented therein (e.g., celestial bodies).

In some implementations, game component 110 may use the instance of the virtual space to facilitate presentation of one or more views of the virtual space to a user. Game component 110 may use the instance of the virtual space to enable a user to interact with the virtual space. In some implementations, the execution of the instance of the virtual space may include game component 110 executing an instance of a game within the virtual space.

Game component 110 may be configured to receive user commands and/or requests to initiate actions at locations within the simulated topography of the virtual space. For example, a user request to initiate an action in the virtual space may specify an action type associated with the requested action. The action type may be used to obtain a function, method, routine, formula, software component or components, and/or any other means that may be used to execute the requested action. A user request to initiate an action may also specify one or more virtual space objects and/or characters to be acted on. Game component 110 may be configured to execute user-requested actions at virtual space locations in an instance of the virtual space. The virtual space locations may include, but not limited to, areas and/or locations appropriate for the virtual space.

Game component 110 may be configured to receive user commands and/or requests to participate in activities in the virtual space and execute those activities. The user-requested activities may include, but is not limited to, initiating virtual space transactions, partaking in a game, miss ion, quest, campaign, expedition, training, tutorial, research and/ or so on in the virtual space, consulting a virtual space expert, messaging other users, convening, and/or any other virtual space activities.

The disclosure of the virtual space determined from the instance executed by game component 110 is not intended to be limiting. The virtual space may be presented in a more limited or richer manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by game component 110, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency that the user can use (e.g., by manipulation of a user character or other user-controlled element, and/or other items) within the virtual space.

In some implementations, the users may participate in the instance of the virtual space by controlling one or more of the available user-controlled elements in the simulated topography of the virtual space. Control may be exercised through control inputs, commands, and/or other requests provided by the users through client computing platforms 104. For example, the commands provided by the user may specify an action involving user-controlled elements at a particular virtual space location. Such a user-initiated action in the virtual space may change the state of the virtual space at an instance when the action is executed in the virtual space. Such a user-initiated action in the virtual space may change views of the virtual space when the action is executed in the virtual space. In some implementations, the execution of commands may facilitate locomotion of user-controlled objects within the simulated topography of the virtual space. The view information may include a depiction of the user-controlled objects within the simulated topography of the virtual space.

Supervisory input component 114 may be configured to receive input from supervisory users. Input from a supervisory user may be referred to as supervisory input or supervisory user input. In some implementations, supervisory input component 114 may be configured to receive supervisory input from a supervisory client computing platform associated with the supervisory user. In some implementations, supervisory input component 114 may be configured to receive supervisory input through one or more user interfaces 130, including but not limited to a supervisory user interface 130. Supervisory input may reflect entry and/or selection by the supervisory user of one or more permissions pertaining to one or more activities. The one or more permissions may pertain to or include permission being granted or denied for a particular user to perform certain types of activities. The certain types of activities may include selling and/or offering for sale a particular virtual item (or any virtual item) in a particular set of virtual items owned by the particular user. In some implementations, the certain types of activities may modify or eliminate ownership rights of virtual items in a particular inventory of a particular user. In some implementations, the one or more permissions may pertain to or include permission being granted or denied for a user to sell and/or offer for sale a particular virtual item in a particular set of virtual items. In some implementations, such permissions may be referred to as sales permissions. In some implementations, the one or more permissions may pertain to or include permission being granted or denied for a user to sell and/or offer for sale a particular type of virtual item in a particular set of virtual items. In some implementations, the one or more permissions may pertain to or include permission being granted or denied for the first user to sell and/or offer for sale a particular virtual item in the first set of virtual items at a particular minimum price level. In some implementations, the one or more permissions may pertain to or include permission being granted or denied for a user to sell and/or offer for sale a particular virtual item after explicit approval from the pertinent supervisory user.

Figure 3A:
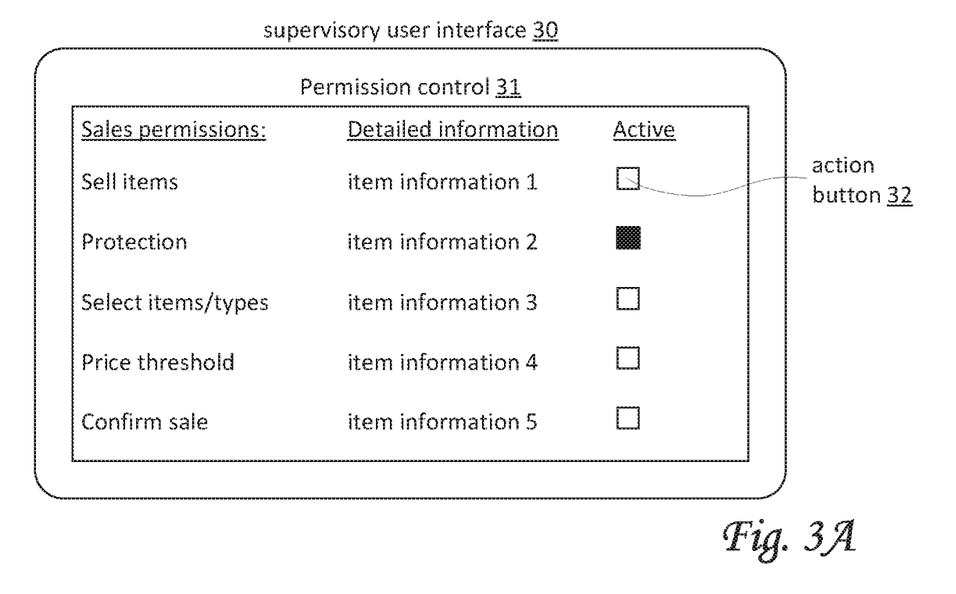
FIGS. 3A-3B illustrate exemplary user interfaces that may be used with a system configured for controlling sales permissions pertaining to (sales) activities by users of an online game that are related to virtual items within the online game, in accordance with one or more implementations.

By way of non-limiting example, FIG. 3A illustrates an exemplary supervisory user interface 30 that may be used with or as part of system 100 to control permissions pertaining to (sales) activities by users of an online game. As depicted in FIG. 3A, supervisory user interface 30 may include graphical user interface elements, including but not limited to permission control element 31, action button 32, and/or other elements. The graphical user interface elements may be used to enter and/or select user input, to present information to a user, and/or to perform or initiate other user interface tasks that facilitate interaction between a user and a system such as system 100 (not depicted). For example, a row of elements in permission control element 31 may represent a particular sales permission that a supervisory user may control through, e.g., an action button such as action button 32. By way of non-limiting example, the first row may represent a general sales permission (for the particular user and user account having an established connection with this supervisory user) to sell or offer for sale any items under control of the particular user. By toggling action button 32 of this first row, general sales permission may be granted (e.g., the particular user is free to sell a particular item) or denied (e.g., the particular user is not free to sell the particular item, or may need to request explicit permission before a sale involving the particular item may be completed). Alternatively, and/or simultaneously, the second row may represent a general protection feature where requested sales activities are flagged, prevented from completion, and/or otherwise prohibited based on a determination of the likelihood of being unfair to the particular user. As depicted, this general protection feature is currently activated in FIG. 3A. For example, a sales price below a certain minimum pricing threshold for the same or similar virtual items may fall under such protection. For example, a sales price below the original purchase price may fall under such protection. For example, system 100 may heuristically determine the likelihood of a requested sales activity being unfair to the particular user.

Alternatively, and/or simultaneously, the third row of permission control element 31 in FIG. 3A may represent control over sales permission pertaining to sales activities for individual items and/or individual types of items. For example, the particular user may be free to sell weapons, but not characters, or vehicles, but not skills. For example, the particular user may be free to sell weapons, except for the rare Flaming Enchanted Sword of Doom. The supervisory user may have a coarse granularity of control in some implementations, and/or a fine granularity of control (e.g., down to individual items) in other implementations.

Alternatively, and/or simultaneously, the fourth row of permission control element 31 in FIG. 3A may represent control over permission pertaining to sales activities for individual items and/or individual types of items based on one or more minimum pricing thresholds. For example, sales of Radioactive Wizard Knives may be controlled by one or more minimum (price) thresholds. In some implementations, a minimum threshold may be an absolute amount that is set by the pertinent supervisory user. In some implementations, a minimum threshold may be a percentage of the original price paid to purchase a particular Radioactive Wizard Knife. In some implementations, a minimum threshold may be a percentage of the current going market rate for (similar) Radioactive Wizard Knives. In some implementations, a minimum threshold may be based on combining multiple rules, percentages, heuristics, and/or other determinations such that the resulting threshold level is deemed unlikely to be unfair to the particular user. In some implementations, such determinations may be modified based on the age of the particular user, such that younger users are provided with a higher level of protection than older users. In some implementations, such determinations may be modified based on the experience level of the particular user in terms of selling items (e.g., the number of sales made in a certain time period, the rate of sales made, the total volume of sales made, etc.) within the online game, such that more inexperienced users are provided with a higher level of protection than more experienced users. In some implementations, such determinations may be modified based on how well the particular user appears to know or is acquainted with a prospective buyer. For example, permissions may be more lenient for sales to close friends within the online game or for sales to buyers who have bought a certain minimum amount (e.g., based on the number of transactions, rate of transactions, sales volume, etc.) in the past. In some implementations, a supervisory user may, for whatever reason, exclude one or more prospective buyers from a particular sale, or from any sales. In some implementations, a supervisory user may, for whatever reason, limit the time-of-day that a particular sale, or any sales, are permitted.

Alternatively, and/or simultaneously, the fifth row of permission control element 31 in FIG. 3A may represent control over permission pertaining to sales activities (either generally, for individual items, and/or for individual types of items) that require (express) permission and/or approval of the pertinent supervisory user. For example, a particular user may wish to sell his Flaming Enchanted Sword of Doom to a particular prospective buyer, or list it for sale for a particular price. Due to a particular type of permission control (e.g., set by the pertinent supervisory user), the sale may not be completed (or the offer may not be publicly listed for sale within the online game) until expressly approved by the pertinent supervisory user. In some implementations, requiring approval and/or confirmation by the pertinent supervisory user may be enabled generally, for particular (types of) virtual items, for a particular price range, for flagged prospective sales, and/or for other sales activities.

Referring to FIG. 1, user input component 116 may be configured to receive input from users. In some implementations, user input component 116 may be configured to receive user input from a particular client computing platform 104 associated with a particular user. In some implementations, user input component 116 may be configured to receive user input through one or more user interfaces 130, including but not limited to a first user interface 130. The user input may reflect entry and/or selection by the particular user of one or more particular virtual items from a particular set of virtual items. In some implementations, the user input may correspond to a request by the particular user to perform a sale and/or an offer for sale of the one or more particular virtual items. For example, offering a particular item for sale may be implemented through a sales listing that is published within the online game such that prospective buyers can find and see the sales listing. In some implementations, the user input may correspond to a request by the particular user to perform an activity within the online game that modifies and/or eliminates ownership rights of one or more virtual items in the inventory of the particular user.

Figure 3B:
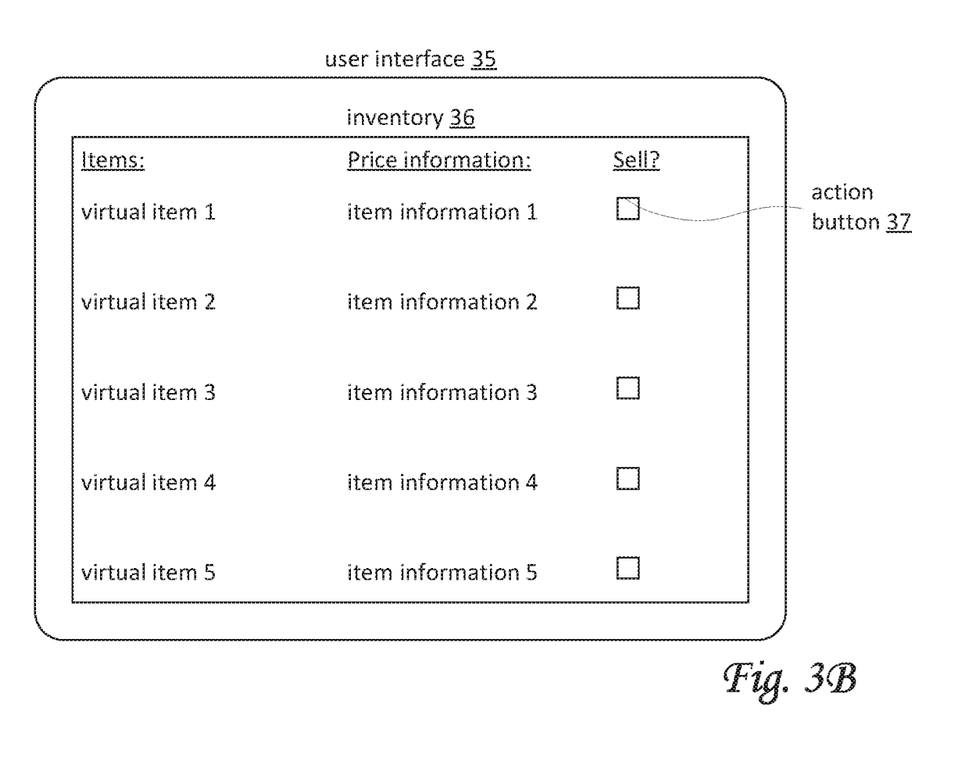

By way of non-limiting example, FIG. 3B illustrates an exemplary user interface 35 that may be used with or as part of system 100 to initiate (sales) activities by a particular users of an online game. As depicted in FIG. 3B, user interface 35 may include graphical user interface elements, including but not limited to inventory element 36, action button 37, and/or other elements. The graphical user interface elements may be used to enter and/or select user input, to present information to a user, and/or to perform or initiate other user interface tasks that facilitate interaction between a user and a system such as system 100 (not depicted). For example, a row of elements in inventory element 36 may represent a particular virtual item that the particular user may use, trade, auction, sell, and/or offer for sale through, e.g., an action button such as action button 37. By way of non-limiting example, the first row may represent a first virtual item, described by first item information, and, as depicted, offered for sale through action button 37. By activating and/or otherwise engaging action button 37, the particular user may initiate and/or request a sales activity involving the first virtual item. similarly, the second row may represent a second virtual item, the third row a third virtual item, and so forth. In some implementations, the (first) item information may include price information, such as the original price paid by the particular user, the current going market rate for similar items, a minimum price threshold set by the pertinent supervisory user, etc.

Referring to FIG. 1, permission component 118 may be configured to determine whether (requests for) sales activities are in accordance with one or more permissions, such as sales permissions. In particular, permission component 118 may be configured to verify whether a prospective trade or sale is allowed by the pertinent supervisory user as indicated through settings and/or supervisory input (e.g., using supervisory input component 114). In some implementations, determinations and/or verifications by permission component 118 may include one or more comparisons. For example, a prospective sales price may be compared with a minimum pricing threshold. For example, a prospective sales activity may be analyzed to determine whether the likelihood of the sales activity being unfair to the particular user is sufficiently low (i.e., below a likelihood threshold). In some implementations, responsive to a failure of any of the determinations, verifications, and/or comparisons by permission component 118, the prospective sales activity may be flagged for supervisory action, prevented from completion, and/or otherwise prohibited.

Sale component 120 may be configured to effectuate performances of activities within the online game, including but not limited to sales activities. In some implementations, sale component 120 may be configured to perform a sale and/or an offer for a sale of one or more particular virtual items. For example, sale component 120 may be configured to perform a particular prospective sale, responsive to a determination (e.g., by permission component 118) that the particular prospective sale (e.g., as requested by a particular user through user input component 116) is permitted under one or more permissions (e.g., as controlled by the pertinent supervisory user through supervisory input component 114). In some implementations, sale component 120 may be configured to perform a particular prospective sale, responsive to determining the particular prospective sale is permitted in view of the one or more pertinent permissions (e.g., sales permissions).

Notification component 122 may be configured to effectuate presentations of notifications to users. In some implementations, a particular notification may convey that a particular sale or a request for a particular sales activity has been completed. In some implementations, a particular notification may convey that a particular user lacks permission to effectuate a particular prospective sale or a request for a particular sales activity. In some implementations, a notification (e.g., regarding lack of permission) may be presented responsive to a determination (e.g., by permission component 118), that the request by a particular user is not permitted under one or more permissions. In some implementations, a particular notification may convey that a particular prospective sale or sales activity requires express approval from the pertinent supervisory user. In some implementations, a particular notification may convey that a particular user would be permitted to effectuate a particular prospective sale or sales activity responsive to a specific modification of the prospective sales price (or provided that the prospective sales price is modified as specified in the notification).

In some implementations, server(s) 102, client computing platform(s) 104, and/or external resources 124 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include one or more processors configured to execute computer program components. The computer program components may be configured to enable an expert or user associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 130 may be configured to facilitate interaction between users and system 100 and/or between users and client computing platforms 104. For example, user interfaces 130 may provide an interface through which users may provide information to and/or receive information from system 100. In some implementations, user interface 130 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 130 may be included in one or more client computing platforms 104. In some implementations, one or more user interfaces 130 may be included in system 100.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from client computing platform(s) 104, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute components 108, 110, 114, 116, 118, 120, and/or 122, and/or other components. Processor(s) 128 may be configured to execute components 108, 110, 114, 116, 118, 120, and/or 122, and/or other components by software; hardware; firmware; some combination of software, hardware, and/or firmware; and/or other mechanisms for configuring processing capabilities on processor(s) 128. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 114, 116, 118, 120, and/or 122 are illustrated in FIG. 1 as being implemented within a single processing unit, in implementations in which processor(s) 128 includes multiple processing units, one or more of components 108, 110, 114, 116, 118, 120, and/or 122 may be implemented remotely from the other components. The description of the functionality provided by the different components 108, 110, 114, 116, 118, 120, and/or 122 described below is for illustrative purposes, and is not intended to be limiting, as any of components 108, 110, 114, 116, 118, 120, and/or 122 may provide more or less functionality than is described. For example, one or more of components 108, 110, 114, 116, 118, 120, and/or 122 may be eliminated, and some or all of its functionality may be provided by other ones of components 108, 110, 114, 116, 118, 120, and/or 122. As another example, processor(s) 128 may be configured to execute one or more additional components that may perform some or all of the functionality attributed below to one of components 108, 110, 114, 116, 118, 120, and/or 122.

Figure 2:
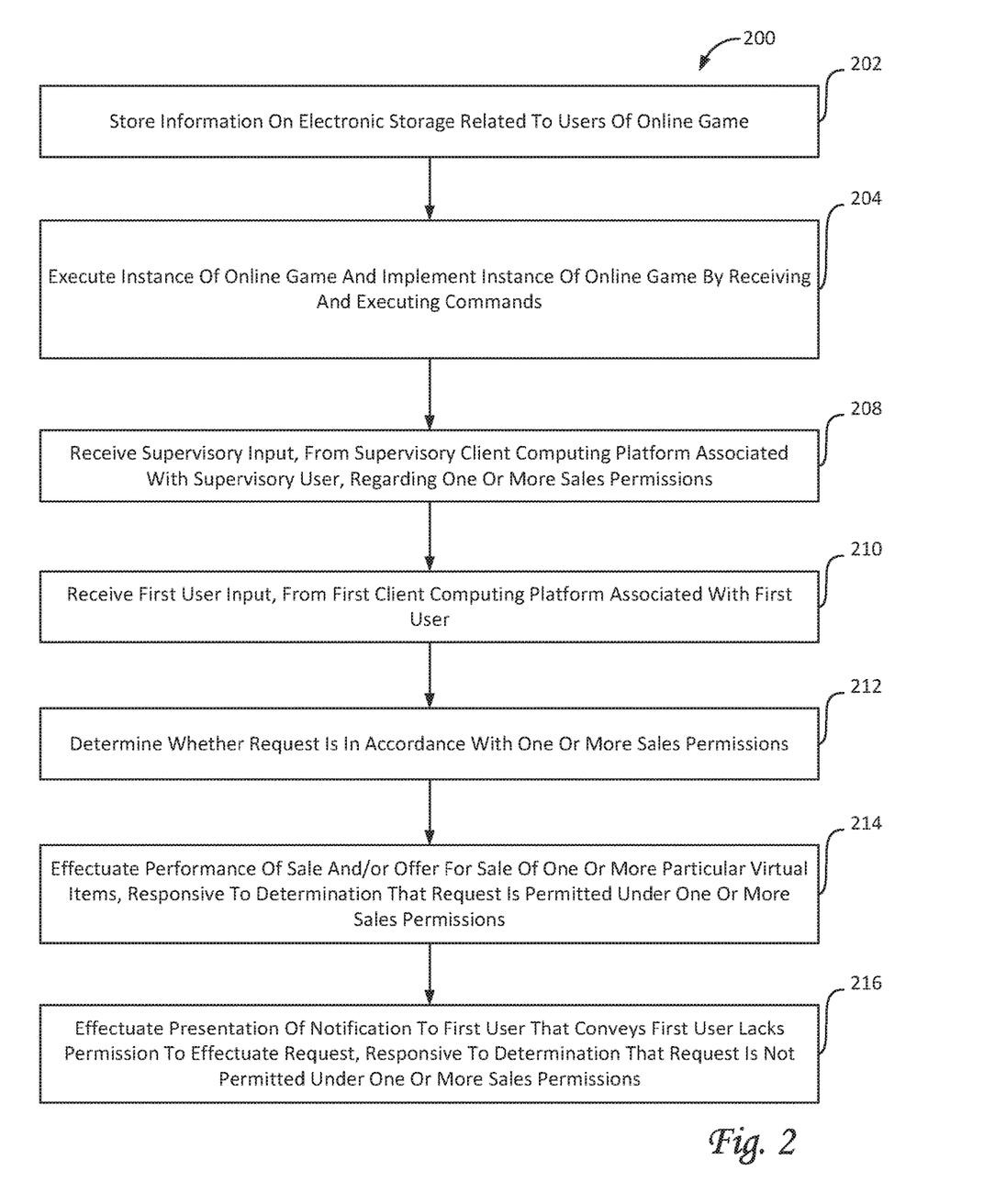
FIG. 2 illustrates a method for controlling sales permissions pertaining to activities by users of an online game that are related to virtual items within the online game, in accordance with one or more implementations.

FIG. 2 illustrates a method 200 for controlling (sales) permissions pertaining to activities by users of an online game that are related to virtual items within the online game, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing information on electronic storage related to the users of the online game. The users may include a supervisory user and a first user. The information may establish a connection between the supervisory user and a first user account. The first user account may be associated with the first user. The first user account may include a first user inventory of a first set of virtual items. Usage of individual ones of the first set of virtual items may be under control of the first user. Operation 202 may be performed by one or more hardware processors configured by machine-readable instructions including a component that is the same as or similar to information storing component 108, in accordance with one or more implementations.

An operation 204 may include executing an instance of the online game and implementing the instance of the online game by receiving and executing commands. The commands may be received from users through client computing platforms associated with the users. Execution of the commands may facilitate interactions between the users, and to determine view information for presentation of the online game to the users on the client computing platforms. Operation 204 may be performed by one or more hardware processors configured by machine-readable instructions including a component that is the same as or similar to game component 110, in accordance with one or more implementations.

An operation 208 may include receiving supervisory input, from a supervisory client computing platform associated with the supervisory user. The supervisory input may reflect entry and/or selection by the supervisory user of one or more (sales) permissions pertaining to one or more activities. The one or more activities may be related to sales and/or offers for sale of one or more virtual items from the first set of virtual items. Operation 208 may be performed by one or more hardware processors configured by machine-readable instructions including a component that is the same as or similar to supervisory input component 114, in accordance with one or more implementations.

An operation 210 may include receiving first user input, from a first client computing platform associated with the first user. The first user input may reflect entry and/or selection by the first user of one or more particular virtual items from the first set of virtual items. The first user input further corresponds to a request by the first user to perform a sale and/or an offer for sale of the one or more particular virtual items. Operation 210 may be performed by one or more hardware processors configured by machine-readable instructions including a component that is the same as or similar to user input component 116, in accordance with one or more implementations.

An operation 212 may include determining whether the request is in accordance with the one or more (sales) permissions. Operation 212 may be performed by one or more hardware processors configured by machine-readable instructions including a component that is the same as or similar to permission component 118, in accordance with one or more implementations.

An operation 214 may include effectuating a performance of the sale and/or the offer for sale of the one or more particular virtual items, responsive to a determination that the request is permitted under the one or more (sales) permissions. Operation 214 may be performed by one or more hardware processors configured by machine-readable instructions including a component that is the same as or similar to sale component 120, in accordance with one or more implementations.

An operation 216 may include effectuating presentation of a notification to the first user that conveys the first user lacks permission to effectuate the request, responsive to a determination that the request is not permitted under the one or more permissions. Operation 216 may be performed by one or more hardware processors configured by machine-readable instructions including a component that is the same as or similar to notification component 122, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for controlling sales permissions pertaining to specific sales activities by users of an online game, wherein the specific sales activities are related to offering for sale virtual items between the users within the online game, the system comprising:

one or more hardware processors configured by machine-readable instructions to:
 store information on electronic storage related to the users of the online game, wherein the users include a supervisory user and a first user, wherein the information establishes a connection between the supervisory user and a first user account, wherein the first user account is associated with the first user, wherein the first user account includes a first user inventory of a first set of virtual items owned by the first user, wherein usage of individual ones of the first set of virtual items is under control of the first user;
 execute, by a game component, an instance of the online game and implement the instance of the online game by receiving and executing commands, wherein the commands are received from the users through client computing platforms associated with the users, wherein execution of the commands facilitates interactions between the users, and to determine view information for presentation of the online game to the users on the client computing platforms;
 present a supervisory user interface to the supervisory user on a supervisory client computing platform, wherein the supervisory client computing platform is associated with the supervisory user, wherein the supervisory user interface presents one or more user interface elements to be utilized for control of a particular sales permission, wherein the one or more user interface elements represent the particular sales permission being granted or denied for the first user to offer for sale a particular type of virtual item in the first set of virtual items to the one or more other users of the online game;
 receive, by a supervisory component, supervisory input, through the supervisory user interface, wherein the supervisory input reflects entry and/or selection of one or more sales permissions by the supervisory user pertaining to the first user offering for sale one or more virtual items from the first set of virtual items to one or more other users of the online game;
 present a first user interface to the first user on a first client computing platform, wherein the first client computing platform is associated with the first user;
 receive first user input, through the first user interface, wherein the first user input reflects entry and/or selection of one or more particular virtual items by the first user from the first set of virtual items, and wherein the first user input further corresponds to a request by the first user to offer for sale the one or more particular virtual items to the one or more other users of the online game;
 make a determination, by a permission component, whether the request by the first user to offer for sale the one or more particular virtual items is permitted in view of the one or more sales permissions pertaining to the first user offering for sale the one or more virtual items from the first set of virtual items to the one or more other users of the online game;
 effectuate a listing of the offer for sale of the one or more particular virtual items as requested by the first user, responsive to the determination that the request is permitted in view of the one or more sales permissions; and
 effectuate presentation, by a notification component, on the first user interface to the first user, of a notification to the first user that conveys the request to offer for sale the one or more particular virtual items is not permitted, responsive to the determination that the request to offer for sale the one or more particular virtual items is not permitted in view of the one or more sales permissions pertaining to the first user offering for sale the one or more virtual items from the first set of virtual items to the one or more other users of the online game.

2. The system of claim 1, wherein the supervisory user is associated with a supervisory user account.

3. The system of claim 1, wherein the supervisory user is associated with the first user account, and wherein access to the first user account by the supervisory user requires a different authentication than access to the first user account by the first user.

4. The system of claim 1, wherein the usage of the individual ones of the first set of virtual items includes performance of actions within the online game that use and/or require the individual ones of the first set of virtual items, and wherein the actions exclude offering for sale the individual ones of the first set of virtual items.

5. The system of claim 1, wherein at least part of the online game takes place in a virtual space that includes a simulated topography, wherein the execution of the commands further facilitates locomotion of user-controlled objects within the simulated topography of the virtual space, and wherein the view information includes a depiction of the user-controlled objects within the simulated topography of the virtual space.

6. The system of claim 1, wherein the one or more sales permissions include a sales permission being granted or denied for the first user to offer for sale any virtual item in the first set of virtual items to the one or more other users of the online game.

7. The system of claim 1, wherein the supervisory user interface presents one or more user interface elements to be utilized for the entry and/or the selection of the one or more sales permissions, wherein a user interface element represents a sales permission being granted or denied for the first user to offer for sale a particular virtual item in the first set of virtual items to the one or more other users of the online game.

8. The system of claim 1, wherein the one or more sales permissions include a sales permission being granted or denied for the first user to offer for sale a particular virtual item in the first set of virtual items, at a particular minimum price level, to the one or more other users of the online game.

9. The system of claim 1, wherein the one or more sales permissions include a sales permission being granted or denied for the first user to offer for sale a particular virtual item to the one or more other users of the online game only after explicit approval from the supervisory user.

10. A method for controlling sales permissions pertaining to specific sales activities by users of an online game, wherein the specific sales activities are related to offering for sale virtual items between the users within the online game, the method comprising:
 storing information on electronic storage related to the users of the online game, wherein the users include a supervisory user and a first user, wherein the information establishes a connection between the supervisory user and a first user account, wherein the first user account is associated with the first user, wherein the first user account includes a first user inventory of a first set of virtual items owned by the first user, wherein usage of individual ones of the first set of virtual items is under control of the first user;

executing, by a (lame component, an instance of the online game, and implementing the instance of the online game by receiving and executing commands, wherein the commands are received from the users through client computing platforms associated with the users, wherein execution of the commands facilitates interactions between the users, and to determine view information for presentation of the online game to the users on the client computing platforms;

presenting a supervisory user interface to the supervisory user on a supervisory client computing platform, wherein the supervisory client computing platform is associated with the supervisory user, wherein the supervisory user interface presents one or more user interface elements to be utilized for control of a particular sales permission, wherein the one or more user interface elements represent the particular sales permission being granted or denied for the first user to offer for sale a particular type of virtual item in the first set of virtual items to the one or more other users of the online game;

receiving, by a supervisory component, supervisory input, through the supervisory user interface, wherein the supervisory input reflects entry and/or selection of one or more sales permissions by the supervisory user pertaining to the first user offering for sale one or more virtual items from the first set of virtual items to one or more other users of the online game;

presenting a first user interface to the first user on a first client computing platform, wherein the first client computing platform is associated with the first user;

receiving first user input, through the first user interface, wherein the first user input reflects entry and/or selection of one or more particular virtual items from the first set of virtual items by the first user, and wherein the first user input further corresponds to a request by the first user to perform a sale and/or an offer for sale the one or more particular virtual items to the one or more other users of the online game;

making a determination, by a permission component, whether the request by the first user to offer for sale the one or more particular virtual items is permitted in view of the one or more sales permissions pertaining to the first user offering for sale the one or more virtual items from the first set of virtual items to the one or more other users of the online game;

effectuating a listing of the offer for sale of the one or more particular virtual items as requested by the first user, responsive to the determination that the request is permitted in view of the one or more sales permissions; and effectuating presentation, by a notification component, on the first user interface to the first user, of a notification to the first user that conveys the request to offer for sale the one or more particular virtual items is not permitted, responsive to the determination that the request to offer for sale the one or more particular virtual items is not permitted in view of the one or more sales permissions related pertaining to the first user offering for sale the one or more virtual items from the first set of virtual items to the one or more other users of the online game.

11. The method of claim 10, wherein the supervisory user is associated with a supervisory user account.

12. The method of claim 10, wherein the supervisory user is associated with the first user account, and wherein access to the first user account by the supervisory user requires a different authentication than access to the first user account by the first user.

13. The method of claim 10, wherein the usage of the individual ones of the first set of virtual items includes performance of actions within the online game that use and/or require the individual ones of the first set of virtual items, and wherein the actions exclude offering for sale the individual ones of the first set of virtual items.

14. The method of claim 10, wherein at least part of the online game takes place in a virtual space that includes a simulated topography, wherein the execution of the commands further facilitates locomotion of user-controlled objects within the simulated topography of the virtual space, and wherein the view information includes a depiction of the user-controlled objects within the simulated topography of the virtual space.

15. The method of claim 10, wherein the one or more sales permissions include a sales permission being granted or denied for the first user to offer for sale any virtual item in the first set of virtual items to the one or more other users of the online game.

16. The method of claim 10, wherein the supervisory user interface presents one or more user interface elements to be utilized for the entry and/or the selection of the one or more sales permissions, wherein a user interface element represents a sales permission being granted or denied for the first user to offer for sale a particular virtual item in the first set of virtual items to the one or more other users of the online game.

17. The method of claim 10, wherein the one or more sales permissions include a sales permission being granted or denied for the first user to offer for sale a particular virtual item in the first set of virtual items, at a particular minimum price level, to the one or more other users of the online game.

18. The method of claim 10, wherein the one or more sales permissions include a sales permission being granted or denied for the first user to offer for sale a particular virtual item to the one or more other users of the online game only after explicit approval from the supervisory user.

* * * * *